United States Patent Office 3,403,176
Patented Sept. 24, 1968

3,403,176
PHOSPHORUS CONTAINING CHELATING AGENT
Burton Peter Block, Wayne, and Gerd Helmut Dahl, King of Prussia, Pa., assignors to Pennsalt Chemicals Corporation, Philadelphia, Pa., a corporation of Pennsylvania
No Drawing. Filed Mar. 16, 1966, Ser. No. 534,650
6 Claims. (Cl. 260—502.4)

ABSTRACT OF THE DISCLOSURE

Chelating agents are prepared of the formula $$[RP(O)OH]_2CH_2$$

where R represents an alkyl radical, substituted alkyl radical, phenyl radical, or substituted phenyl radical. These P,P'-disubstituted methylenediphosphinic acids are used as intermediates in the preparation of chelates of titanium which in turn are useful in the preparation of chelated titanium phosphinate polymers useful as corrosion resistant coatings.

---

This invention concerns new phosphorus containing chelating agents which yield chelate rings that are free of carbon to carbon bonds. More particularly, this invention relates to P,P'-disubstituted-methylenediphosphinic acids of the formula $[RP(O)OH]_2CH_2$ where R represents an alkyl radical or halogeno-substituted alkyl radical having one to ten carbon atoms, or a phenyl radical or mono- or multi-substituted phenyl radical wherein the substituents on said phenyl group are independently selected from the group consisting of the halogens and alkyl groups having one to eight carbon atoms; the halogen substituents on said substituted radicals are selected from the group consisting of fluorine, chlorine and bromine. Representative substituted radicals are, for example, ortho - chlorophenyl, ortho - methylphenyl, pentafluorophenyl, 2,4 - dichlorophenyl, 2,4 - dimethylphenyl, ethylphenyl, chloromethylphenyl, ortho-bromophenyl, chloromethyl, heptafluoroisopropyl, fluorocyclohexyl and the like.

The chelating agent of this invention, $$[RP(O)OH]_2CH_2$$

may be pictorially represented by the following structure, the R radicals being as previously defined.

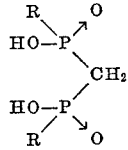

The compound of this invention is conveniently prepared by reacting methylene iodide with the appropriate dialkyl phosphinite represented by the formula $RP(OR')_2$ where R is as previously defined and R' is an alkyl radical having one to four carbon atoms (methyl, ethyl, isopropyl, isobutyl, etc.), followed by hydrolysis of the resulting compound. The course of the reactions may be depicted as follows:

(I) $2[RP(OR')_2] + CH_2I_2 \rightarrow 2R'I + [RP(O)OR']_2CH_2$ (II) $[RP(O)OR']_2CH_2 + 2H_2O \rightarrow [RP(O)OH]_2CH_2 + 2R'OH$ The foregoing reaction (I) is generally carried out at a temperature within the range of about 140° to about 180° C. The more volatile, by-product alkyl iodide is advantageously recovered by distillation as it is evolved during the course of the reaction. The reaction is normally terminated after about 1 to 3 hours. It may be conducted in inert organic diluents and solvents, for example, xylene or ortho-dichlorobenzene. The product mixture is hydrolyzed by refluxing with aqueous HCl or $H_2SO_4$ in accordance with reaction (II). The mixture is cooled to precipitate the solid, phosphorus-containing chelating agent which can be further purified by recrystallization from such solvents as ethanol, methanol, and water.

The P,P'-disubstituted-methylene diphosphinic acids of this invention are used as intermediates in the preparation of chelates of titanium as described in our copending application Ser. No. 554,698, filed June 2, 1966. The titanium chelates are obtained by reacting a titanium alkoxide, i.e., $Ti(OR'')_4$ where R'' is an alkyl group having one to four carbon atoms, with the phosphorus containing chelating agent, viz.

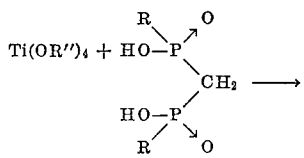

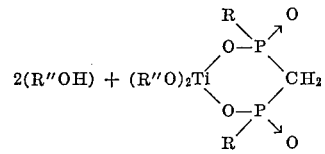

The above titanium chelate compound is in turn utilized to prepare chelated titanium-phosphinate polymers as described in our copending application Ser. No. 554,698, filed June 2, 1966, by reacting said chelate with a diphenylphosphinic acid or alkylphenylphosphinic acid. The resulting polymers are characterized by enhanced thermal stability due to the absence of carbon to carbon bonds in the main polymer backbone. These polymers, which have softening points in the range of about 170° C. to over 300° C. are suitable as corrosion resistant coatings for metal surfaces exposed to salt water spray. The polymers can also be melt spun into fibers and the like.

The examples that follow serve to clarify the invention as well as to illustrate the utilization of the compounds claimed herein as intermediates. Examples I, VI, VII and VIII are concerned with the preparation of diarylmethylene-diphosphinic acids and Examples II, III, IV and V illustrate the preparation of dialkylmethylene-diphosphinic acids.

EXAMPLE I

Preparation of chelating agent $CH_2I_2$ (75 g., 0.28 mole) is mixed with $C_6H_5P[OCH(CH_3)_2]_2$ (186 g., 0.82 mole) in a flask which is then immersed in an oil bath preheated to 175° C. There is evolution of $(CH_3)_2CHI$ from the reaction mixture at a temperature of 150° C. After one hour, 100 ml. of concentrated hydrochloric acid solution is added to the flask and the mixture is refluxed for about 15 hours. Water is removed from the mixture by distillation, using benzene as an azeotroping agent to remove the final traces thereof. The solution is cooled to about 25° C. resulting in the precipitation of a solid which is recovered by filtration and recrystallized from ethanol. The product (yield is 43%) has a melting point of 233–234° C. and is identified as P,P'-diphenylmethylenediphosphinic acid having the formula $[C_6H_5P(O)OH]_2CH_2$.

*Analysis.*—Found: C, 52.72; H, 5.08; P, 20.39; neutral equivalent, 146.6. Calculated for $C_{13}H_{14}O_4P_2$: C, 52.71; H, 4.76; P, 20.92; neutral equivalent, 148.1.

Preparation of titanium chelate

A portion of the above-prepared P,P'-diphenylmethylenediphosphinic acid (5.79 g., 0.0196 mole) is added with stirring to a solution of titanium isoproproxide (5.56 g., 0.0196 mole) in 175 ml. of benzene maintained under a nitrogen atmosphere. The benezene and liberated isopropanol are removed from the reaction mixture by distillation and the product residue is dried in vacuo. The product is identified as the titanium chelate compound

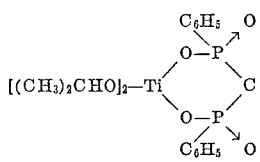

*Analysis.*—Found: C, 48.96; H, 8.95; Ti, 10.7. Calculated for $C_{19}H_{26}O_6P_2Ti$: C, 49.58; H, 5.70; Ti, 10.4.

The titanium chelate, recovered in a 96% yield, is an infusible white solid which is soluble in common organic solvents.

Preparation of titanium phosphinate polymer

Approximately 1.8 parts of the above-described titanium chelate compound are dissolved in benzene. 1.22 parts of methylphenylphosphinic acid, $(CH_3)(C_6H_5)P(O)OH$, are mixed therewith to give a clear solution. The benzene and by-product isopropanol are removed by distillation to leave a polymeric product in 98% yield having the appearance of a white solid. It is dried in vacuo at 90° C. The polymer, which has a softening point of 170° C., is soluble in organic solvents such as ethanol, $CHCl_3$, acetone, and tetrahydrofuran. The following repeating structural unit is assigned to this polymeric substance.

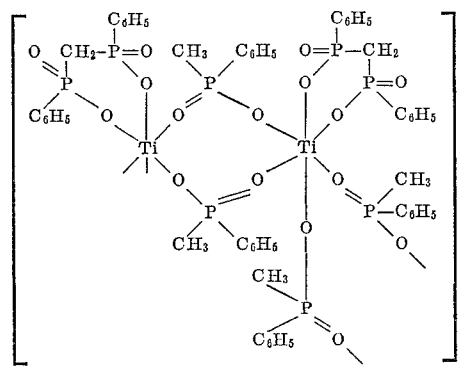

*Analysis.*—Found: C, 49.78; H, 5.28; P, 19.25; Ti, 7.26. Calculated for $C_{27}H_{28}O_8P_4Ti$: C, 49.71; H, 4.33; P, 19.04; Ti, 7.34.

EXAMPLE II

Employing synthesis techniques similar to those of Example I, $CH_2I_2$ is mixed with $CH_3P[OCH(CH_3)_2]_2$ and allowed to react at ca. 140° C. After the evolution of isopropyl iodide ends, the reaction mixture is treated with concentrated hydrochloric acid. The hygroscopic acid, $[CH_3P(O)OH]_2CH_2$, is obtained by recrystallization from ethanol.

EXAMPLE III

Using a similar procedure, $(ClCH_2)P(OC_4H_9)_2$ is reacted with $CH_2I_2$. The product is hydrolyzed and identified as $[(ClCH_2)P(O)OH]_2CH_2$ after crystallization.

EXAMPLE IV $CH_2I_2$ is reacted with an excess of $CF_3P(OC_4H_9)_2$ at elevated temperature. Upon completed reaction the ester is hydrolyzed and the water removed by azeotropic distillation. The resulting acid, $[CF_3P(O)OH]_2CH_2$, is recrystallized from methanol.

EXAMPLE V $[(C_3H_7)P(O)(OH)]_2CH_2$ is prepared by reacting $CH_2I_2$ with $n-C_3H_7P[OCH(CH_3)_2]_2$ under conditions as described in Example I. After hydrolysis the product acid is purified by recrystallization from methanol.

EXAMPLE VI

The chelating agent $[(ClC_6H_4)P(O)OH]_2CH_2$ is obtained from the reaction of $CH_2I_2$ with

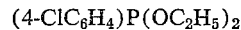

in the presence of xylene followed by hydrolysis. After removal of volatiles the crude product is purified by crystallization.

EXAMPLE VII

The reaction between $CH_2I_2$ and

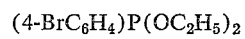

gave a product which is hydrolyzed as described. Purification by crystallization yields $[(BrC_6H_4P(O)OH]_2CH_2$.

EXAMPLE VIII

A mixture of $CH_2I_2$ with an excess of

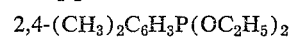

is heated to produce an intermediate which is hydrolyzed to give the product $[2,4-(CH_3)_2C_6H_3P(O)OH]_2CH_2$.

We claim:
1. A P,P' - disubstituted - methylenediphosphinic acid chelating agent of the formula $[RP(O)OH]_2CH_2$ where R represents a radical selected from the class consisting of
   (a) alkyl having one to ten carbon atoms;
   (b) halogeno-substituted alkyl having one to ten carbon atoms wherein the halogen substituents are selected from the group consisting of fluorine, chlorine and bromine;
   (c) phenyl;
   (d) substituted phenyl wherein the substituents are independently selected from the group consisting of fluorine, chlorine, bromine and alkyl groups having one to eight carbon atoms.
2. A compound according to claim 1 wherein R is phenyl.
3. A compound according to claim 1 wherein R is methyl.
4. A compound according to claim 1 wherein R is chloro-phenyl.
5. A compound according to claim 1 wherein R is xylyl.
6. A compound according to claim 1 wherein R is trifluoromethyl.

References Cited

UNITED STATES PATENTS 3,157,694 11/1964 Harwood _____ 260—502.4
3,171,818 5/1965 Sander _____ 260—969
3,251,907 5/1966 Roy _____ 260—502.4

OTHER REFERENCES

Mastalerz, "Chem. Abstr.," vol. 60 (1964), pp. 14535, 14536, QDIA51.

Cade, "J. Chem. Soc." (1959), pp. 2266 to 2272, QDIC6.

BERNARD HELFIN, *Primary Examiner.*

J. E. EVANS, *Assistant Examiner.*